United States Patent [19]

Hamada et al.

[11] 4,034,680

[45] July 12, 1977

[54] DUAL-MODE BUS

[75] Inventors: Mitsuharu Hamada, Yokohama; Hiroshi Sugiyama, Hiratsuka; Hiromichi Uchiyama, Yokosuka; Shinji Katayose, Yokohama, all of Japan

[73] Assignee: Nissan Motor Co., Ltd., Yokohama, Japan

[21] Appl. No.: 593,948

[22] Filed: July 8, 1975

[30] Foreign Application Priority Data

July 10, 1974 Japan .............................. 49-78947

[51] Int. Cl.$^2$ ..................... B60L 5/36; B61F 9/00
[52] U.S. Cl. .............................. 104/140; 104/247; 191/59.1; 191/60.2
[58] Field of Search .......... 104/247, 242, 245, 140, 104/148 MS; 191/2, 49, 59.1, 60.2, 77, 82

[56] References Cited

U.S. PATENT DOCUMENTS

| 3,712,430 | 1/1973 | Charamel et al. | 191/49 |
| 3,786,762 | 1/1974 | Corkum et al. | 191/59.1 |

FOREIGN PATENT DOCUMENTS

| 483,881 | 10/1929 | Germany | 191/49 |

Primary Examiner—Albert J. Makay
Assistant Examiner—Carl Rowold

[57] ABSTRACT

The disclosure relates to a dual-mode bus which is operable on a guideway under automatic control and also operable on ordinary surface streets or highways under the control by a bus driver. The dual-mode bus comprises a rear axle having at both ends thereof traction wheels, a frame supported on the axle and a current collector. A floating support is connected between a differential gear housing of the rear axle and the frame and has two spaced portions, first one of which is disposed nearer to the axle than second one of the two spaced portions thereof. An arm having two spaced portions is provided, first one and second one of which are connected to the first and second portions of the floating support, respectively. The arm carries the current collector at a third portion spaced on the same side as the first portion of the arm, from the second portion of the arm. The third portion is spaced, further than the first portion of said arm, from the second portion of the arm. Two parallel links having the same length pivotally interconnects the corresponding portions of the arm and the floating support and means is provided for selectively urging the collector on the arm to its extended operative position and moving the collector to its stored inoperative position.

2 Claims, 6 Drawing Figures

DUAL-MODE BUS

The present invention relates to dual-mode buses which are operated by bus drivers on conventional surface streets for collection and distribution of passengers and by driverless automatic control on the guideway network, and more particularly to a dual-mode bus equipped with a pair of guide wheels and at least one current collector at the rear of the vehicle for operation on the guideway network.

Among various kinds of trasportation systems under investigation, there is a transportation system, called "dual-mode bus" system, providing for operation of buses under automatic control on specifically constructed "guideway network" and under manual control on the usual types of roads or highways to facilitate collection and distribution of passengers.

It is now required that the dual-mode bus be equipped with a pair of rear guide wheels on the rear of the vehicle body, in addition to a pair of front guide wheels operatively connected with the vehicle front wheels to steer the vehicle along a guideway on which the vehicle travels. Unless the rear guide wheels are attached to the vehicle, the rear portion of the vehicle body might engage, due to its large body size, with one of the guide walls on both sides of the guideway when the vehicle makes a turn along the guideway (see FIG. 6).

One of the conventional constructions having been proposed comprises an arm attached to an unsprung portion of a vehicle below a suspension spring and extending rearwardly, a rear guide wheel and a current collector mounted on the rear end of the arm (see FIG. 4). In this construction the arm has to be reinforced to withstand the weight of the guide wheel and the current collector. Another conventional construction employs a caster to hold an arm carrying a guide wheel and a current collector in its appropriate position (see FIG. 5). These conventional constructions have a drawback that an arm carrying a guide wheel and a current collector has to be reinforced in construction or provided with a caster.

It is an object of the present invention to provide a wheeled vehicle in which an arm adapted to carry a guide wheel and a current collector has two spaced portions connected to the corresponding two spaced portions of a floating support connected between an unsprung and sprung portion of the vehicle. The arm is movable with the floating support and thus has a third portion thereon which corresponds to the unsprung portion of the floating support. On the third portion of the arm the current collector should be mounted, so that the current collector may be kept in contact with an electric cable in one of upstanding guide walls on both sides of a guideway.

With the above-mentioned construction, because the arm is connected at their spaced portions to the corresponding two spaced portion of the floating support between the unsprung and sprung portions of the vehicle, the arm can withstand the weight of the guide wheel and the current collector without being reinforced.

It is another object of the present invention to provide a wheeled vehicle of the above character, in which the guide wheels and current collector are moved to their stored inoperative positions when the vehicle is operated on ordinary surface streets or highways.

Other objects, features and advantages of the present invention will become clear by referring to the following description in connection with the accompanying drawings, in which.

Figure 1:
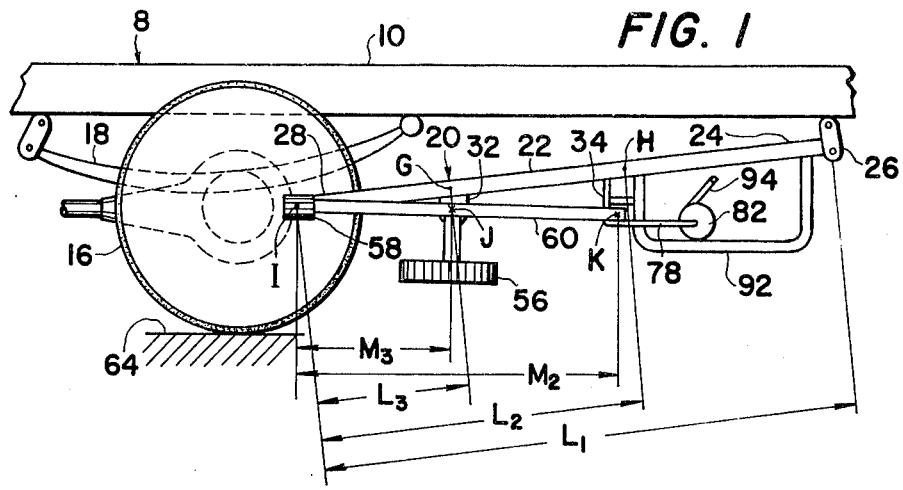
FIG. 1 is a side view of a rear portion of a chassis of a dual-mode bus and shows a first preferred embodiment of the present invention.
Figure 2:
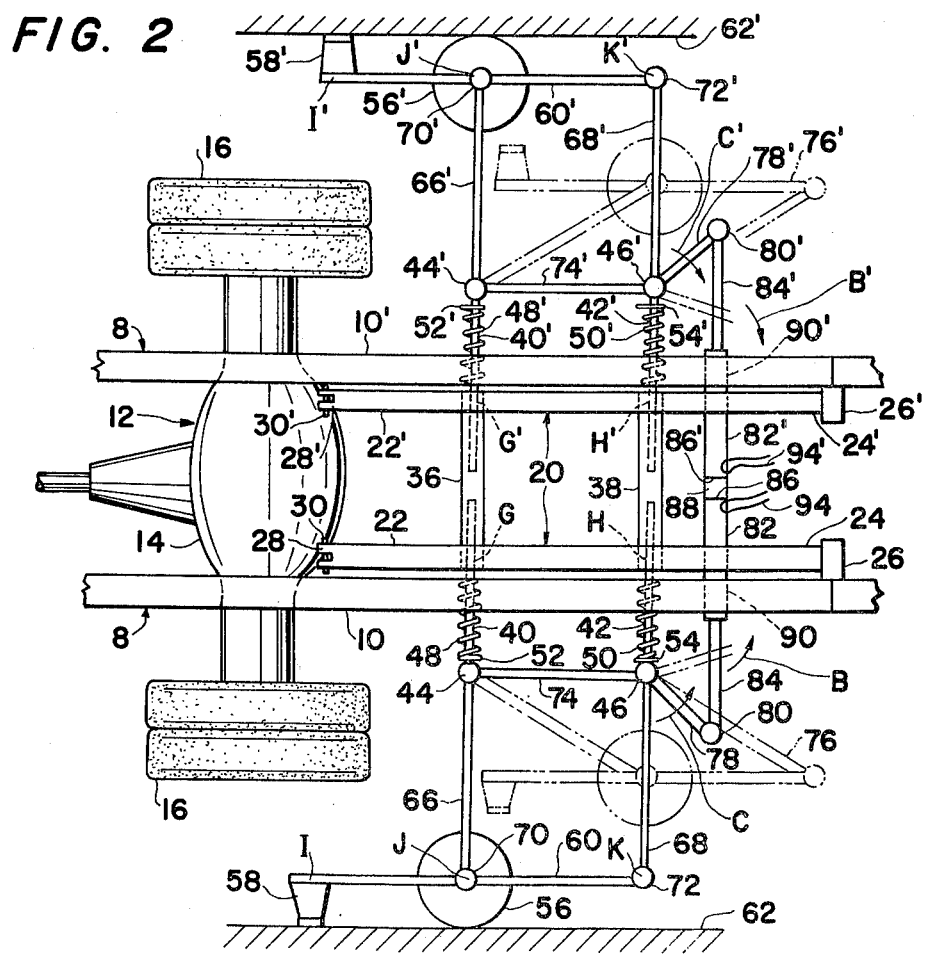
FIG. 2 is a plan view of FIG. 1.

Referring to FIGS. 1 and 2, there is shown a rear portion of a chassis of a dual-mode bus that is equipped for automatic guideway operation and manual street operation, in which a reference numeral 8 generally indicates a frame structure, only longitudinally extending side frames 10 and 10' thereof being shown. A rear axle housing 12 including a differential gear housing 14 has traction wheels 16 at both ends. The frame 8 is supported on the rear axle housing 12 by means of a rear suspension unit of leaf spring type, only one plate spring assembly of the rear suspension unit being shown in FIG. 1.

The construction as described above may be any one suitable conventional design of ordinary buses.

A floating support generally designated by a reference numeral 20 comprises two beams 22 and 22'. Rear ends 24 and 24' of the beams 22 and 22' are connected by shackles 26 and 26' with the side frames 10 and 10', respectively, their forward ends 28 and 28' are hingedly attached to the differential gear housing 14 by means of fixed horizontal pins 30 and 30', respectively. Each of the beams 22 and 22' is provided at two longitudinally spaced portions G and H (or G' and H') thereon with two mounting brackets 32 and 34 (or 32' and 34'). Two elongated bearings 36 and 38 are mounted fixedly to the beams 22 and 22' by mounting brackets 32, 32', 34 and 34' in such a manner that they extend transversely relative to the vehicle in juxtaposed relationship. Two rods 40 and 42 are slidably disposed at their inward ends in the two bearings 36 and 38, respectively, and their outward ends have joints 44 and 46, respectively. Similarly, two rods 40' and 42', having joints 44' and 46', respectively, are slidably disposed in the bearings 36 and 38. Two compression springs 48 and 50 arranged around the rods 40 and 42, respectively, are compressed between a spring retainer 52 secured to the rod 40 and the axial end of the bearing 36 and between a spring retainer 54 secured to the rod 42 and the axial end of the bearing 38, respectively. On the other hand, compression springs 48' and 50' are compressed between a spring retainer 52' secured to the rod 40' and the opposite axial end of the bearing 36 and between a spring retainer 54' secured to the rod 42' and the opposite axial end of the bearing 38, respectively. With these spring arrangements, the joints 44 and 46 are biased laterally outwardly from the side frame 10 and the joints 44' and 46', on the other hand, are biased laterally outwardly from the side frame 10', with the result that guide wheels 56 and 56' are kept in pressure contact with the adjacent upstanding guide walls 62 and 62' of a guideway and current collectors 58 and 58' with electric cables (not shown) in the guide walls 62 and 62'.

The guide wheel 56 is rotatably carried by an arm 60 and the current collector 58 is mounted to the same arm, while the guide wheel 56' is rotatably carried by an arm 60' and the current collector 58 is mounted to the same arm. The arm 60 has a forward end portion I to which the current collector 58 is mounted and is carried at two portions J and K thereon by the beam 22 in such a manner that the portions J and K will move with the portions G and H, respectively, if the beam 22 vibrates about the horizontal pin 30. The arm 60' has, in the same manner, a forward end portion I' to which the current collector 58' and is carried at two portions J' and K' thereon by the beam 22' in such a manner that the portions J' and K' will move with the portions G' and H', respectively, if the beam 22' vibrates about the horizontal pin 30'.

Two parallel links 66 and 68, having the same length, are pivotally attached at their head ends to the portions J and K of the arm 60 by means of joints 70 and 72, respectively, and also pivotally attached at their tail ends to the rods 40 and 42 by means of the joints 44 and 46, respectively, thereby forming a parallelogram plane linkage. Two similar parallel links 66' and 68', having the same length, are pivotally attached at their head ends and tail ends to the portions J' and K' and the rods 40' and 42', respectively, by means of joints 70', 72', 44' and 46', thereby forming another parallelogram plane linkage. Links 74 and 74' are connected to the joints 44 and 46 and the joints 44' and 46' respectively and serve as fixed links of the corresponding parallelogram plane linkages because the length of the link 74 is the same as that of distance $\overline{JK}$ and the length of the link 74' is the same as that of distance $\overline{J'K'}$. These links 74 and 74' serve as reinforcement members too.

The links 68 and 68' have integral control arms 78 and 78' to provide bell-cranks. The control arms 78 and 78' have joints 80 and 80', respectively. To operate the control arms 78 and 78', two hydraulic cylinders 82 and 82' are arranged on the beams 22 and 22', respectively, and have their piston rods 84 and 84' pivoted to the control arms 78 and 78' by means of the joints 80 and 80', respectively. The two hydraulic cylinders 82 and 82' have interposed between their inward ends 86 and 86'. A gas spring 88 and their outward end portions 90 and 90' are slidably mounted within brackets attached to the two beams 22 and 22', only one bracket being shown in FIG. 1 and indicated by 92. Conventional means is provided to selectively supply the working medium to the cylinder 82 and 82' and to exhaust it therefrom through conduits 94 and 94'. The conduits 94 and 94' communicate with the cylinders 82 and 82', respectively.

As best seen in FIG. 2, when the vehicle travels on the guideway 64 the parallelogram linkages are in their extended positions in which the guide wheels 56 and 56' are urged into contact with the adjacent guide walls 62 and 62', respectively and the current collectors 58 and 58' are kept in contact with the corresponding electric cables (not shown) mounted to the guide walls 62 and 62', respectively.

When the vehicle travels on the guideway 64, there occurs little vibration of the horizontal pins 30 and 30' on the differential gear housing 14 because the wheels 16 run the surface of the guideway 64 which is made flat, whereas the rear ends 24 and 24' will vibrate relatively greatly in response to transfer and/or change of load on the side frames 10 and 10'.

The amplitude of vibration of the portion G on the beam 22 to which the bracket 32 is attached securely can be given by $$A_3 = (L_3/L_1) A_1 \ldots \quad (1)$$

where:
$A_1$ is the amplitude of vibration of the rearward end 24 of the beam 22;
$A_3$ is the amplitude of vibration of the portion G on the beam 22;
$L_1$ is the length of the distance between the forward end 28 and the rearward end 24 of the beam 22; and
$L_3$ is the length of the distance between the forward end 28 and the portion G of the beam 22 if the amplitude of vibration of the forward end 28 of the beam 22 is negligible and can be assumed to be zero.

The amplitude of vibration of the portion H on the beam 22 to which the bracket 34 is attached securely can be given by $$A_2 = L_2/L_1 A_1 \ldots \quad (2)$$

where:
$A_2$ is the amplitude of vibration of the H on the beam 22; and
$L_2$ is the length of the distance between the forward end portion 28 and the portion H of the beam 22.

Since the portions J and K of the arm 60 are movable with the portions G and H of the beam 22, the amplitudes of vibrations of the portions J and K are same as those of the portions G and H, respectively. Therefore it will be noted that if the portion I of the arm 60 satisfies the following relation $$M_3/M_2 = L_3/L_2 \ldots \quad (3)$$

where:
$M_2$ is the length of the distance between the portion I and the portion K of the arm 60; and
$M_3$ is the length of the distance between the portion I and the portion J of the arm 60, the amplitude of vibration of the portion I of the arm 60 is same as that of the forward end portion 28 of the beam 22 and substantially zero when the vehicle is travelling on the guideway 64. It will also be noted that it is necessary that the portion I be spaced on the same side as the portion J, from the portion K.

Since the portions 28', G', H' and 24' of the beam 22' are in symmetrical relation, around the longitudinal direction of the vehicle, with the portions 28, G, H, and 24 of the beam, and the portions I', J' and K' of the arm 60' are in synmmetrical relation, around the longitudinal direction of the vehicle, with the portions I, J and I of the arm 60, the amplitude of vibration of the portions I' of the arm 60' is the same as that of the forward end portion 28' of the beam 22' and substantially zero when the vehicle is travelling on the guideway 64.

It will now be appreciated that the current collectors 58 and 58' mounted to the portions I and I' are kept in substantially the same height from the guideway 64 even if the rearward end portions 24 and 24' of the beams 22 and 22' vibrate due to the transfer and/or change of load on the side frames 10 and 10'.

When the vehicle travels on ordinary roads or highways, it is not necessary to hold the parallelogram linkages in their extended positions to urge the guide wheels 56 and 56' and the current collectors 58 and 58' in their extended operative positions illustrated by solid lines in FIG. 2. To collapse the parallelogram linkages to move the guide wheels 56 and 56' and the current collectors 58 and 58' operative to the stored inoperative positions illustrated by imaginary lines (see FIG. 2) when they are not in use, the working medium is exhausted from the cylinders 82 and 82'. The exhaust of the working medium from the cylinders 82 and 82', retracting inwardly the piston rods 84 and 84', causes the cylinders 82 and 82' to pivot about the gas bag 88 in the respective directions indicated by arrows B and B'. Then rotative movement, about the joints 46 and 46', of the links 68 and 68' in directions indicated by arrows C and C' results, thereby collapsing the parallelogram linkages to the positions designated by 76 and 76', respectively. Thus the guide wheels 56 and 56' and the current collectors 58 and 58' are moved to stored positions adjacent the side frames 10 and 10', which stored positions should preferably be located laterally inwardly of the wheels 16 and under the vehicle body (not shown).

Figure 3:
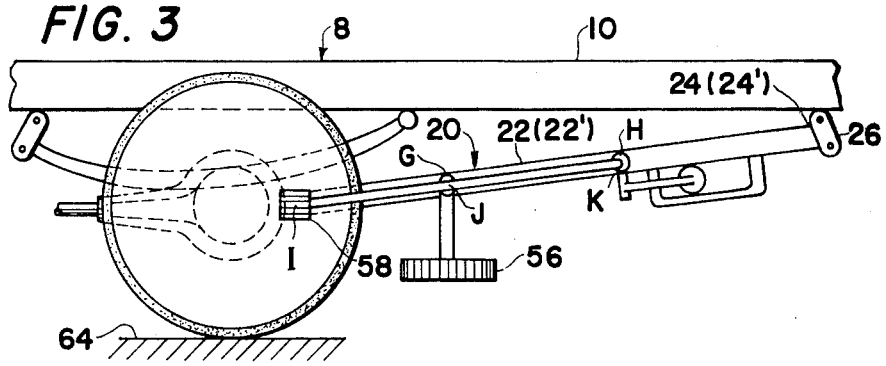
FIG. 3 is a similar view to FIG. 1 and shows a second preferred embodiment of the present invention.
Figure 4:
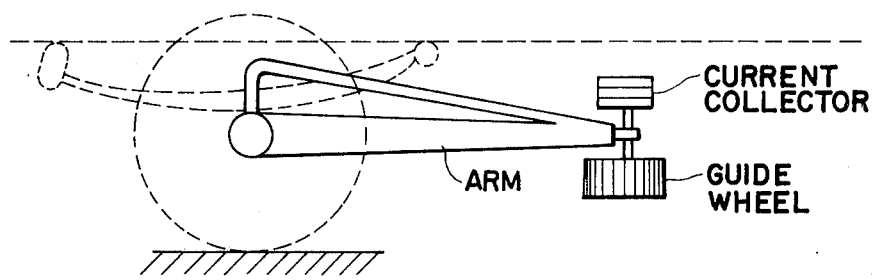
FIGS. 4 and 5 are similar views to FIG. 1 and show the two exemplified prior arts.
Figure 5:
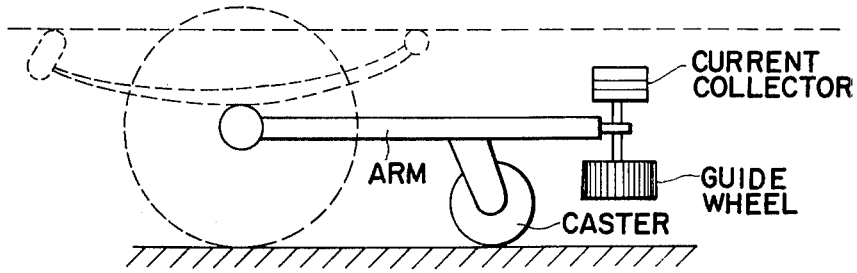
Figure 6:
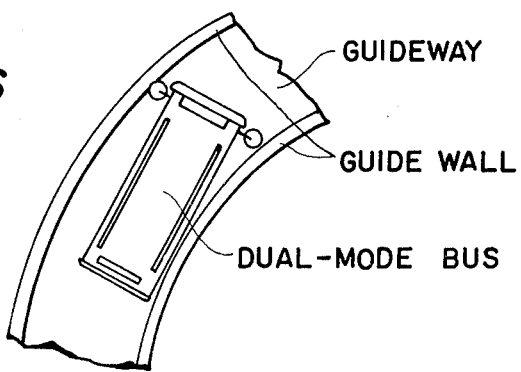
FIG. 6 is diagrammatic plan view of a guideway in which a dual-mode bus equipped only with a pair of front guide wheels makes a turn along the guideway.

Referring to FIG. 3, there is shown another embodiment of the present invention which is different from the first preferred embodiment illustrated in FIGS. 1 and 2 in that parallelogram linkages are connected to side beams 22 and 22' of a floating support 20. The other construction of this embodiment and the operation thereof is substantially similar to those of the first embodiment, thus further description as to be construction of this embodiment and as to the operation thereof being omitted for the sake of simplicity.

It will now be appreciated that in the dual-mode bus thus described, the current collectors 58 and 58' are kept at substantially the same height from the guideway 64 and in contact with the electric cable mounted to the guide wall 62 or 62' by the relatively less rigid construction for supporting the guide wheels 56 and 56' and the current collectors 58 and 58'.

What is claimed is:

1. In a dual-mode bus adapted to travel on a guideway having on both sides thereof two upstanding guide walls, at least one of said two upstanding guide walls being installed with an electric cable, comprising a rear axle having at both ends thereof wheels and an axle housing, a frame supported on the axle and a current collector engageable with the electric cable, the frame having two side frames:

a floating support comprising two beams, said two beams being connected hingedly at their one ends to the axle housing at two transversely spaced locations thereon, respectively, and being connected at their opposite ends by shackles with the side frames, respectively, each of said two beams having two spaced portions, first one of each of said two beams being disposed nearer to the axle than second one of said two spaced portions thereof;

a first arm having a first portion and a second portion spaced from the first portion thereof;

a second arm having a first portion and a second portion spaced from the first portion thereof;

means mounting said first portions of said first arm and second arm to said first portions of said two beams and said second portions of said first arm and second arm to said second portions of said two beams, respectively;

a first guide wheel rotatably carried by said first arm and contacting with one of the two upstanding guide walls;

a second guide wheel rotatably carried by said second arm and contacting opposite one of the two upstanding guide walls;

at least one of said first and second arms carrying the current collector at a third portion, said third portion being spaced, farther than said first portion of said at least one arm, from said second portion of said at least one arm; and resilient means for urging said first and second arms toward said one and said opposite one of the two upstanding guide walls, respectively.

2. In a dual-mode bus as claimed in claim 1, in which a distance between said third portion of said one arm and said first portion of said one arm to a distance between said third portion of said arm and said second portion of said arm being substantially the same as a distance between said one end of the corresponding one of said two beams and said first portion of the corresponding beam and said second portion of the corresponding beam.

* * * * *